United States Patent
Lv et al.

(10) Patent No.: US 9,173,227 B2
(45) Date of Patent: Oct. 27, 2015

(54) SYSTEM COMPATIBILITY METHOD AND APPARATUS

(75) Inventors: Yongxia Lv, Beijing (CN); Xuehuan Wang, Chengdu (CN); Xin Xiong, Beijing (CN); Junxian Mo, Shenzhen (CN); Qiyong Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 707 days.

(21) Appl. No.: 13/323,225

(22) Filed: Dec. 12, 2011

(65) Prior Publication Data

US 2012/0082071 A1    Apr. 5, 2012

Related U.S. Application Data

(63) Continuation of application No. PCT/CN2009/072261, filed on Jun. 12, 2009.

(51) Int. Cl.
*H04W 72/12* (2009.01)
*H04W 48/10* (2009.01)
*H04W 88/10* (2009.01)

(52) U.S. Cl.
CPC .......... *H04W 72/1215* (2013.01); *H04W 48/10* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 8,331,309 B2 * | 12/2012 | Marsh et al. | 370/330 |
| 8,427,998 B2 * | 4/2013 | Choi et al. | 370/314 |
| 8,630,251 B2 * | 1/2014 | Kwak et al. | 370/330 |
| 2005/0181823 A1 | 8/2005 | Haartsen | |
| 2006/0050742 A1 * | 3/2006 | Grandhi et al. | 370/506 |
| 2008/0095195 A1 * | 4/2008 | Ahmadi et al. | 370/478 |
| 2008/0205329 A1 * | 8/2008 | Dominique et al. | 370/328 |
| 2008/0220791 A1 * | 9/2008 | Cho et al. | 455/450 |
| 2008/0273493 A1 * | 11/2008 | Fong | 370/330 |
| 2009/0016371 A1 * | 1/2009 | Zheng et al. | 370/431 |
| 2009/0067377 A1 * | 3/2009 | Talukdar et al. | 370/329 |
| 2009/0116427 A1 | 5/2009 | Marks et al. | |

(Continued)

FOREIGN PATENT DOCUMENTS

| | | |
|---|---|---|
| CN | 101015149 A | 8/2007 |
| CN | 101043743 A | 9/2007 |
| CN | 101252776 A | 8/2008 |
| CN | 101262702 A | 9/2008 |
| CN | 101365152 A | 2/2009 |
| WO | 2009062115 A2 | 5/2009 |

OTHER PUBLICATIONS

First Office Action of Chinese Application No. 200980159560.9 mailed May 24, 2013, 15 pages. (Partial Translation).
International Search Report and translation received in Patent Cooperation Treaty Application No. PCT/CN2009/072261, mailed Mar. 25, 2010, 8 pages.
Written Opinion of the International Searching Authority and translation received in Patent Cooperation Treaty Application No. PCT/CN2009/072261, mailed Mar. 25, 2010, 6 pages.

*Primary Examiner* — Chirag Shah
*Assistant Examiner* — Joshua Smith
(74) *Attorney, Agent, or Firm* — Slater & Matsil, L.L.P.

(57) ABSTRACT

A system compatibility method and apparatus are disclosed. The system compatibility method includes sending, according to a downlink resource configured in a new frame structure of a first system, information of a downlink resource carrier. The information of the downlink resource carrier includes information of a downlink resource carrier compatible with a second system. Information of an uplink resource carrier is received according to an uplink resource configured in the new frame structure of the first system. The information of the uplink resource carrier includes information of an uplink resource carrier compatible with the second system.

19 Claims, 6 Drawing Sheets

(56) References Cited

U.S. PATENT DOCUMENTS

| | | | |
|---|---|---|---|
| 2009/0161591 A1* | 6/2009 | Ahmadi et al. | 370/312 |
| 2009/0180410 A1* | 7/2009 | Lee et al. | 370/294 |
| 2009/0185632 A1* | 7/2009 | Cai et al. | 375/260 |
| 2009/0252203 A1* | 10/2009 | Goldhamer | 455/15 |
| 2010/0046464 A1* | 2/2010 | Kwak et al. | 370/330 |
| 2010/0054161 A1* | 3/2010 | Montojo et al. | 370/280 |
| 2010/0061333 A1* | 3/2010 | Marsh et al. | 370/330 |
| 2011/0019622 A1* | 1/2011 | Lee et al. | 370/328 |
| 2011/0026461 A1* | 2/2011 | Tee et al. | 370/328 |
| 2011/0032855 A1* | 2/2011 | Kim et al. | 370/294 |

\* cited by examiner

SYSTEM COMPATIBILITY METHOD AND APPARATUS

CROSS-REFERENCE TO RELATED APPLICATIONS

This application is a continuation of International Application No. PCT/CN2009/072261, filed on Jun. 12, 2009, which is hereby incorporated by reference in its entireties.

FIELD OF THE INVENTION

The present invention relates to the communications field, and in particular, to a system compatibility method and apparatus.

BACKGROUND OF THE INVENTION

Long term evolution (LTE) proposed by the 3rd Generation Partnership Project (3GPP) is the largest new technology R&D project of the 3GPP in the recent two years. The LTE project focuses on the orthogonal frequency division multiple access (OFDMA) and multi-input multi-output (MIMO) technologies. The main performance objectives of the 3GPP LTE project include: a downlink rate of 100 Mbps and a peak uplink rate of 50 Mbps can be provided at a 20 MHz spectral bandwidth, and may be used to improve the performance of cell edge users, so as to increase the cell capacity and reduce the system delay. When the internal unidirectional transmission delay of the user plane is shorter than 5 ms, it takes the control plane less than 50 ms to transition from the sleep state to the active state, and less than 100 ms to transition from the camping state to the active state. In addition, a cell coverage with the radius of 100 km may be supported; over 100 kbps access services can be provided for users who move at the speed of 350 km/h; paired or unpaired spectrums can also be supported; and various bandwidths ranging from 1.25 MHz to 20 MHz may be flexibly configured.

To support a higher system bandwidth and achieve larger capacity and higher spectrum efficiency, the LTE-advanced (LTE-A) system introduces an important feature, that is, carrier aggregation (CA). CA depends on the terminal capability, service requirement, and network configuration. CA may be CA of continuous spectrums or CA of discontinuous spectrums. The bandwidths aggregated by CA may be the same or different, for example, the aggregation of 5 MHz and 10 MHz.

The LTE-A system is evolved from the LTE system and also represents the evolution direction of communication systems in the future. To implement the evolution from the 802.16e system to the time division duplex (TDD) LTE-A system, one carrier may be used to carry 802.16e system, and another carrier may be used to carry TDD LTE-A. The 16e system needs to occupy a carrier even if there are only few users in the 802.16e system, thereby causing a waste of resources. To reduce the waste of resources, the physical layer of the 16e system may be integrated with the physical layer of the TDD LTE-A system. However, because the TDD LTE-A system cannot satisfy the synchronous transceiving requirement on the entire network, large interference may occur between systems, so that the systems cannot work normally.

SUMMARY OF THE INVENTION

Embodiments of the present invention provide a system compatibility method and apparatus, which can reduce inter-system interference, implement compatibility between different systems, and can maximize the resource utilization.

A system compatibility method includes sending information of a downlink resource carrier according to a downlink resource configured in a new frame structure of a first system. The information of the downlink resource carrier includes information of a downlink resource carrier compatible with a second system. Information of an uplink resource carrier is received, according to an uplink resource configured in the new frame structure of the first system. The information of the uplink resource carrier includes information of an uplink resource carrier compatible with the second system.

A system compatibility method includes receiving information of a downlink resource carrier according to a downlink resource configured in a new frame structure of a first system. The information of the downlink resource carrier includes information of a downlink resource carrier compatible with a second system. Information of an uplink resource carrier is sent according to an uplink resource configured in the new frame structure of the first system. The information of the uplink resource carrier includes information of an uplink resource carrier compatible with the second system.

A system compatibility apparatus includes a sending unit and a receiving unit. The sending unit is configured to send, according to a downlink resource configured in a new frame structure of a first system, information of a downlink resource carrier. The information of the downlink resource carrier includes information of a downlink resource carrier compatible with a second system. The receiving unit is configured to receive, according to an uplink resource configured in the new frame structure of the first system, information of an uplink resource carrier. The information of the uplink resource carrier includes information of an uplink resource carrier compatible with the second system.

A user equipment (UE) includes a receiving unit and a sending unit. The receiving unit is configured to receive, according to a downlink resource configured in a new frame structure of a first system, information of a downlink resource carrier. The information of the downlink resource carrier includes information of a downlink resource carrier compatible with a second system. The sending unit is configured to send, according to an uplink resource configured in the new frame structure of the first system, information of an uplink resource. The information of the uplink resource includes information of an uplink resource carrier compatible with the second system.

In embodiments of the present invention, in a CA scenario of the second system, the information of the downlink resource carrier is sent according to the downlink resource configured in the new frame structure of the first system, where the information of the downlink resource carrier includes the information of the downlink resource carrier compatible with the second system; the information of the uplink resource carrier is received according to the uplink resource configured in the new frame structure of the first system, where the information of the uplink resource carrier includes the information of the uplink resource carrier compatible with the second system. In this way, the second system uses a part of time-frequency resources on non-compatible carriers, and the remaining part of time-frequency resources are allocated to a terminal of the first system. In this manner, in one aspect, the integration and coexistence of the two systems can be implemented, and inter-system interference is reduced; and in another aspect, the resource utilization can be maximized.

BRIEF DESCRIPTION OF THE DRAWINGS

To illustrate the technical solutions in the embodiments of the present invention or in the prior art more clearly, the accompanying drawings for describing the embodiments or the prior art are given briefly below. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Embodiments of the present invention provide a system compatibility method and apparatus. The technical solutions in the embodiments of the present invention are hereinafter described in detail with reference to the accompanying drawings in the embodiments. Apparently, the embodiments to be described are merely some rather than all of the embodiments of the present invention. On the basis of the embodiments of the present invention, all other embodiments that those skilled in the art derive should fall within the protection scope of the present invention.

The 802.16e protocol is formulated by the 802.16e working group of the Institute of Electrical and Electronics Engineers (IEEE). The protocol can support mobile broadband access. The 802.16e system is briefly referred to as the 16e system in the following.

A length of a subframe of the 16e system is 5 ms, and the subframe includes 47 symbols, 2 forward points, a transmission interval being 160 us, and a receiving interval being 60 us. A first symbol of the subframe is a preamble, and a second symbol is a downlink map (D_MAP) or an uplink map (UL_MAP). Table 1 shows the uplink/downlink subframe configuration ratio in the 16e system, including the number of uplink symbols and the number of downlink symbols in the 16e system.

TABLE 1

Uplink/Downlink Partial Configurations in the 16e System (the number of downlink symbols to the number of uplink symbols)

35:12
34:13
33:14
32:15
31:16
30:17
29:18

TABLE 1-continued

Uplink/Downlink Partial Configurations in the 16e System (the number of downlink symbols to the number of uplink symbols)

28:19
27:20
26:21

Figure 1:
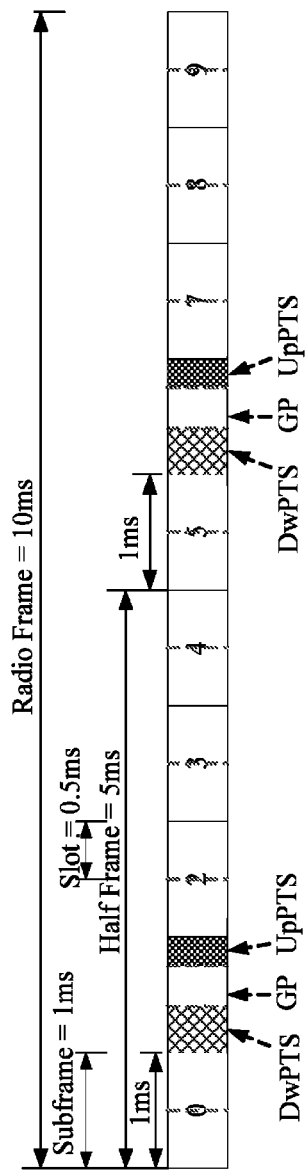
FIG. 1 is a schematic diagram of a frame structure of a TDD LTE system.

FIG. 1 is a structural schematic diagram of a LTE TDD frame. A 10 ms radio frame is formed by two 5 ms half frames. Each half frame is formed by four ordinary 1 ms subframes and one special subframe, where each ordinary subframe is formed by two 0.5 ms slots and the special subframe is formed by three types of timeslots, namely, UpPTS, GP, and DwPTS timeslots. The uplink/downlink configuration ratio of the LTE TDD frame structure is as shown in Table 2, where u indicates an uplink subframe, D indicates a downlink subframe, and S indicates a special subframe.

TABLE 2

| Uplink/Downlink Configuration | Switching Period from Downlink to Uplink | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 3 lists various configuration options of lengths of the three types of special timeslots, namely, UpPTS, guard period (GP), and DwPTS, where a length of the DwPTS is 3 to 12 OFDM symbols, a length of the UpPTS is 1 to 2 OFDM symbols, the DwPTS is a downlink special timeslot, and the UpPTS is an uplink special timeslot.

TABLE 3

| Configuration Options | Subframe with a Normal Cyclic Prefix (OFDM Symbol) | | | Subframe with an Extended Cyclic Prefix (OFDM Symbol) | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | | | |
| 8 | 11 | 1 | 2 | | | |

Figure 2:
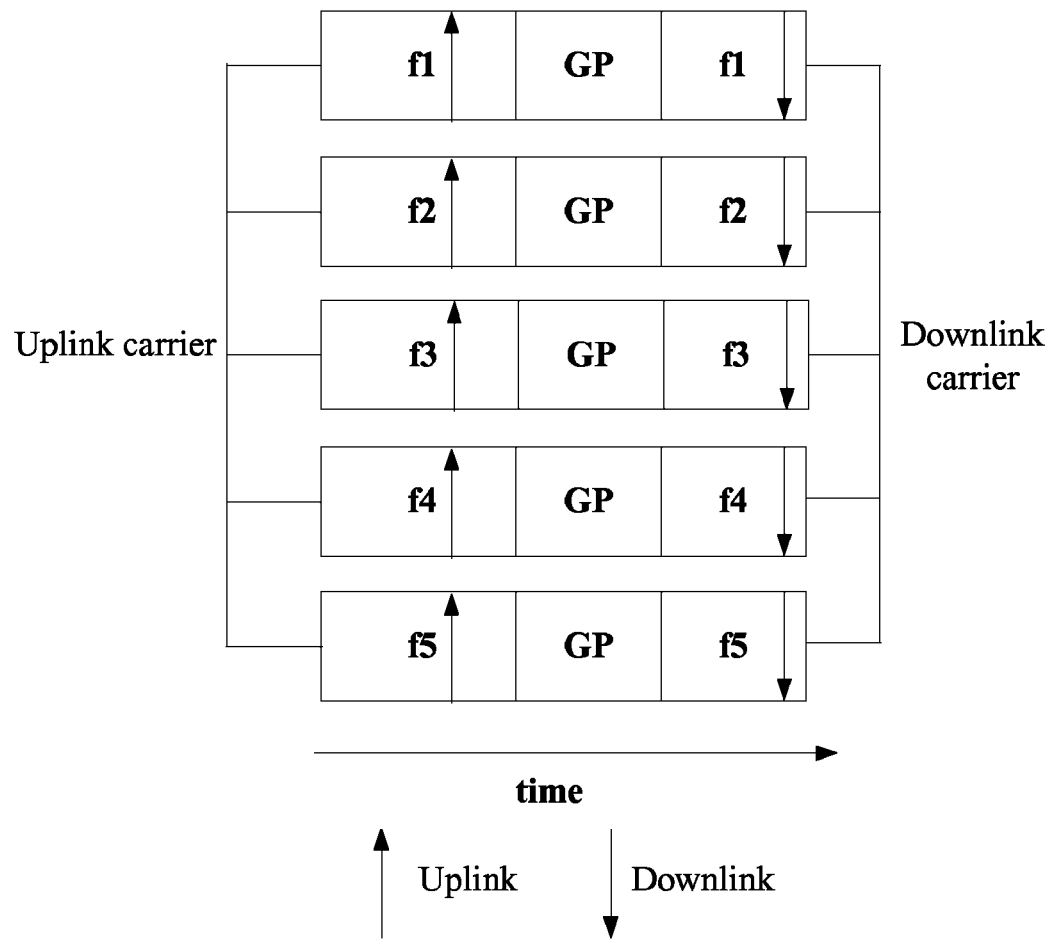
FIG. 2 is a schematic diagram of a CA scenario of TDD LTE-A.

CA has become a mandatory feature of the TDD LTE-A system standard. FIG. 2 is a schematic diagram of a CA scenario of the TDD LTE-A system. Within a certain period of time, all branch carriers f1 to f5 are aggregated into an uplink carrier; in another period of time, all branch carriers are aggregated into a downlink carrier.

The LTE-A system is evolved from the LTE system and also represents the evolution direction of communication systems in the future. To implement the evolution from the 16e system to the TDD LTE-A system, one carrier may be used to carry the 16e system, and another carrier may be used to carry the TDD LTE-A system. The 16e system needs to occupy a carrier even if there are only few users in the 16e system, thereby causing a waste of resources. Embodiments of the present invention provide a system compatibility method and apparatus, which can reduce inter-system interference, implement compatibility between different systems, and maximize the resource utilization.

The present invention is hereinafter described in detail with reference to specific embodiments.

Figure 3:
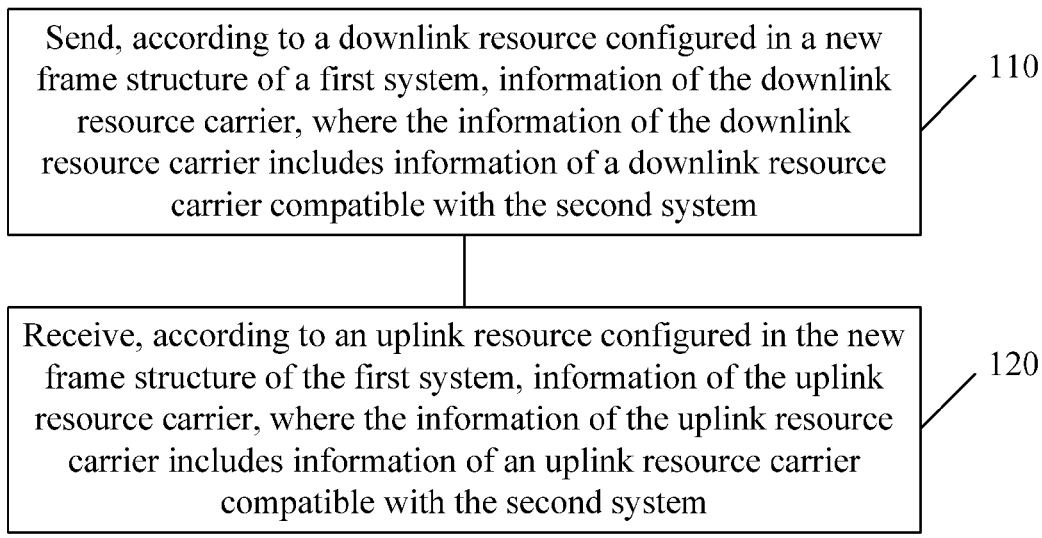
FIG. 3 is a flowchart of a system compatibility method in a first embodiment of the present invention.

Referring to FIG. 3, a method for reducing the interference of carrier compatibility in a first embodiment according to an embodiment of the present invention includes steps as outlined below.

Step 110: Send, according to a downlink resource configured in a new frame structure of a first system, information of the downlink resource carrier, where the information of the downlink resource carrier includes information of a downlink resource carrier compatible with a second system.

Step 120: Receive, according to an uplink resource configured in the new frame structure of the first system, information of the uplink resource, where the information of the uplink resource carrier includes information of an uplink resource carrier compatible with the second system.

The new frame structure is integrated by a frame structure of the TDD LTE-A system and a frame structure of the 16e system. Under the frame structure, the two systems can be guaranteed to work normally. The embodiment is only one type of implementation modes of the technical solutions. In the embodiment of the present invention, step 120 may be executed before step 110, and the execution sequence is not limited.

In the embodiment, in a CA scenario of the second system, the information of the downlink resource carrier is sent according to the downlink resource configured in the new frame structure of the first system, where the information of the downlink resource carrier includes the information of the downlink resource carrier compatible with the second system; the information of the uplink resource carrier is received according to the uplink resource configured in the new frame structure of the first system, where the information of the uplink resource carrier includes the information of the uplink resource carrier compatible with the second system. In this way, the second system uses a part of time-frequency resources on non-compatible carriers, and the remaining part of time-frequency resources are allocated to a terminal of the first system. In this manner, in one aspect, the integration and coexistence of the two systems can be implemented, and inter-system interference is reduced; and in another aspect, the resource utilization can be maximized.

For better understanding of the technical solutions of the embodiments of the present invention, the following takes the TDD LTE-A system being the first system and the 16e system being the second system as an example for further detailed description. It should be noted that the technical solutions of the embodiments of the present invention may be applied in multiple types of communication systems. For example, the second system may be a 16 M system, which is not limited herein.

Figure 4:
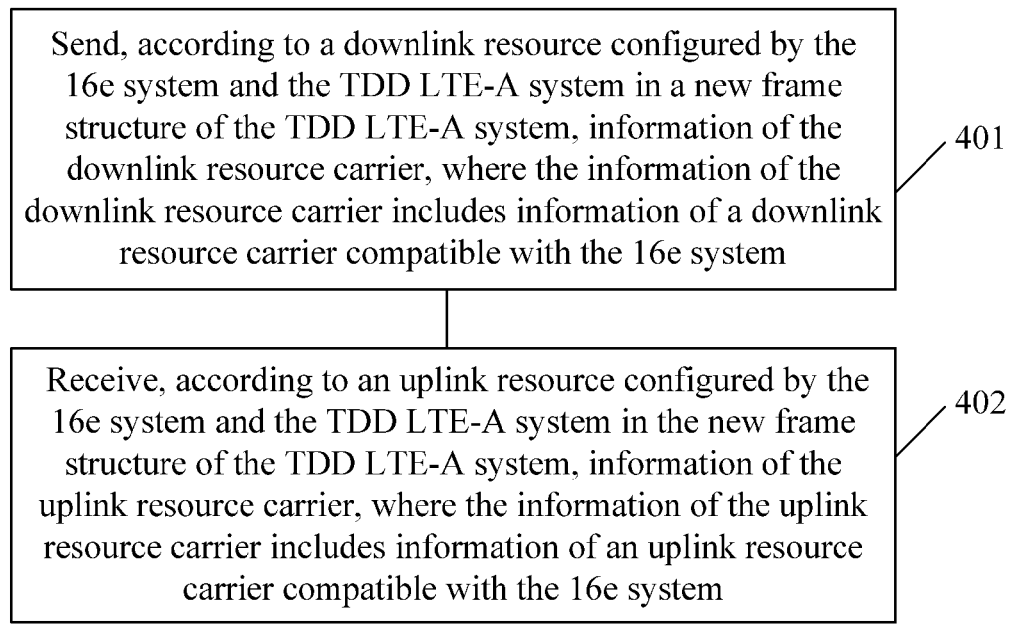
FIG. 4 is a flowchart of a system compatibility method in a second embodiment of the present invention.

In embodiments of the present invention, a part of time-frequency resources of a non-backward compatible carrier of the TDD LTE-A system may be used to carry 16e signals, and the remaining part of the time-frequency resources of the non-backward compatible carrier are allocated to a terminal of the TDD LTE-A system. As shown in FIG. 4, a system compatibility method of the present invention is shown.

Step 401: Send, according to a downlink resource configured by the 16e system and the TDD LTE-A system in a new frame structure of the TDD LTE-A system, information of the downlink resource carrier, where the information of the downlink resource carrier includes information of a downlink resource carrier compatible with the 16e system.

The new frame structure is integrated by a frame structure of the TDD LTE-A system and a frame structure of the 16e system. Under the frame structure, the two systems can be guaranteed to work normally. The new frame structure specifically includes an uplink resource and a downlink resource used by the 16e system, and an uplink resource used by the TDD LTE-A system; or an uplink resource and a downlink resource used by the 16e system, and a downlink resource used by the TDD LTE-A system; or an uplink resource and a downlink resource used by the 16e system, and an uplink resource and a downlink resource used by the TDD LTE-A system.

The uplink resource used by the 16e system is located at an uplink start part of the new frame structure and/or the GP of the TDD LTE-A system. The downlink resource used by the 16e system is located at a subframe other than a first subframe and a second subframe of the new frame structure.

Or, the downlink resource configured in the new frame structure of the TDD LTE-A system includes at least a subframe, and the subframe has a length of 1 ms.

Or, the uplink resource allocated in the new frame structure of the TDD LTE-A system includes at least a subframe, and the subframe has a length of 1 ms.

In the new frame structure, a first symbol of a downlink part used by the 16e system is a preamble, and the DL_MAP starts to be carried on a second symbol. Or, in the new frame structure, the number of symbols of an uplink part used by the 16e system is greater than or equal to 2. In the new frame structure, a radio frame of the 16e system may have a length of 5 ms; a transmission switching interval may be 160 us; a receiving switching interval may be 60 us.

Step 402: Receive, according to an uplink resource configured by the 16e system and the TDD LTE-A system in the new frame structure of the TDD LTE-A system, information of the uplink resource carrier, where the information of the uplink resource carrier includes information of an uplink resource carrier compatible with the 16e system.

The information that is carried by the uplink resource in the new frame structure of the TDD LTE-A system and is sent from the terminal is received.

The TDD LTE-A system includes multiple carrier resources. At least one carrier carries the new frame structure, and at least one carrier carries a frame structure of a special subframe. The start position of the carrier that carries the new frame structure is the same as that of the carrier that carries the frame structure of the special subframe. The at least one carrier that carries the new frame structure is a backward compatible carrier.

Before sending, according to the downlink resource configured in the new frame structure of the first system, the information of the downlink resource carrier, the method further includes: the multiple carrier resources further include at least one carrier that carries a broadcast message or a unicast message, and the broadcast message or the unicast message carries the uplink/downlink configuration information of the new frame structure and configuration information of resources used by the TDD LTE-A system and the 16e system. The configuration information of the resources used by the TDD LTE-A system and the 16e system includes configuration of the special subframe in the new frame structure, a ratio of the number of symbols of the downlink resource used by the second system to the number of symbols of the uplink resource used by the second system, and a ratio of the number of subframes configured in the downlink resource used by the first system to the number of subframes configured in the uplink resource used by the first system or a ratio of the number of symbols of the downlink resource used by the first system to the number of symbols of the uplink resource used by the first system.

Therefore, the TDD LTE-A system compatible with the 16e system, in one aspect, needs to satisfy two conditions. One condition is that the DwPTS needs to be reserved for the base station, and a time-domain length of the DwPTS needs to satisfy configuration of a DwPTS timeslot in the special subframe in Table 3, that is, a length of the DwPTS may be 3 to 12 OFDM symbols. Another condition is that lengths of a normal downlink subframe and a normal uplink subframe (minimum scheduling unit) may both be 1 ms. In the new frame structure, the length of the radio frame of the 16e system may be 5 ms; the transmission switching interval may be 160 us; the receiving switching interval may be 60 us.

The TDD LTE-A system compatible with the 16e system, in another aspect, also needs to consider a synchronous transceiving requirement of the TDD system. A configuration ratio that can satisfy the synchronous transceiving requirement must be obtained from ratios of uplink configurations to downlink configurations of the two systems to avoid interference and guarantee the normal operation of the system.

The following describes the technical solutions in detail, supposing a part of time-frequency resources of the non-backward compatible carrier of the TDD LTE-A system are used to carry 16e signals and the remaining part of the time-frequency resources of the non-backward compatible carrier are allocated to the terminal of the TDD LTE-A system.

Figure 5:
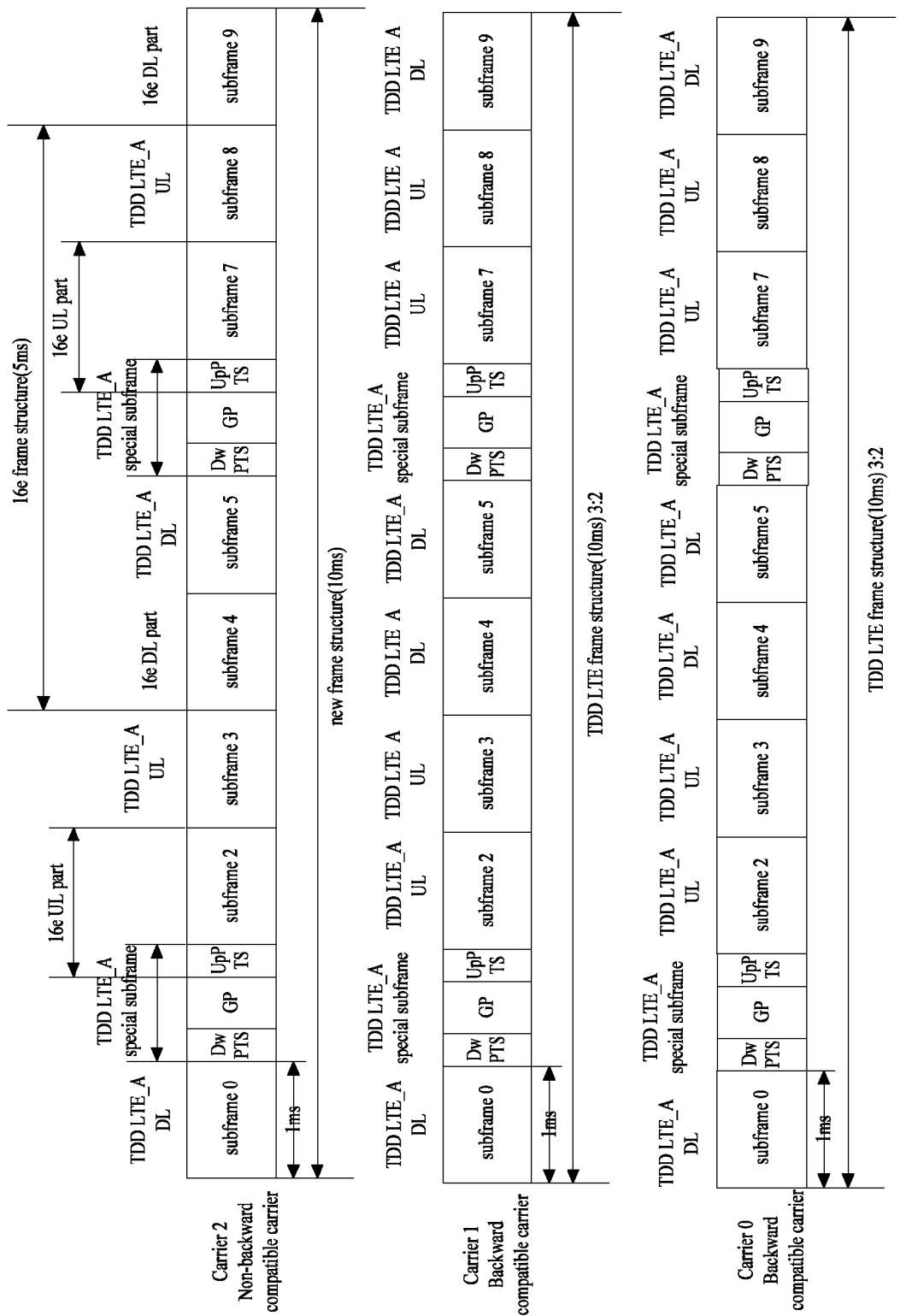
FIG. 5 shows a structure of subframes with a subframe configuration ratio of 3:2 in a TDD LTE-A system backward compatible with a TDD LTE system and a 16e system.
Figure 6:
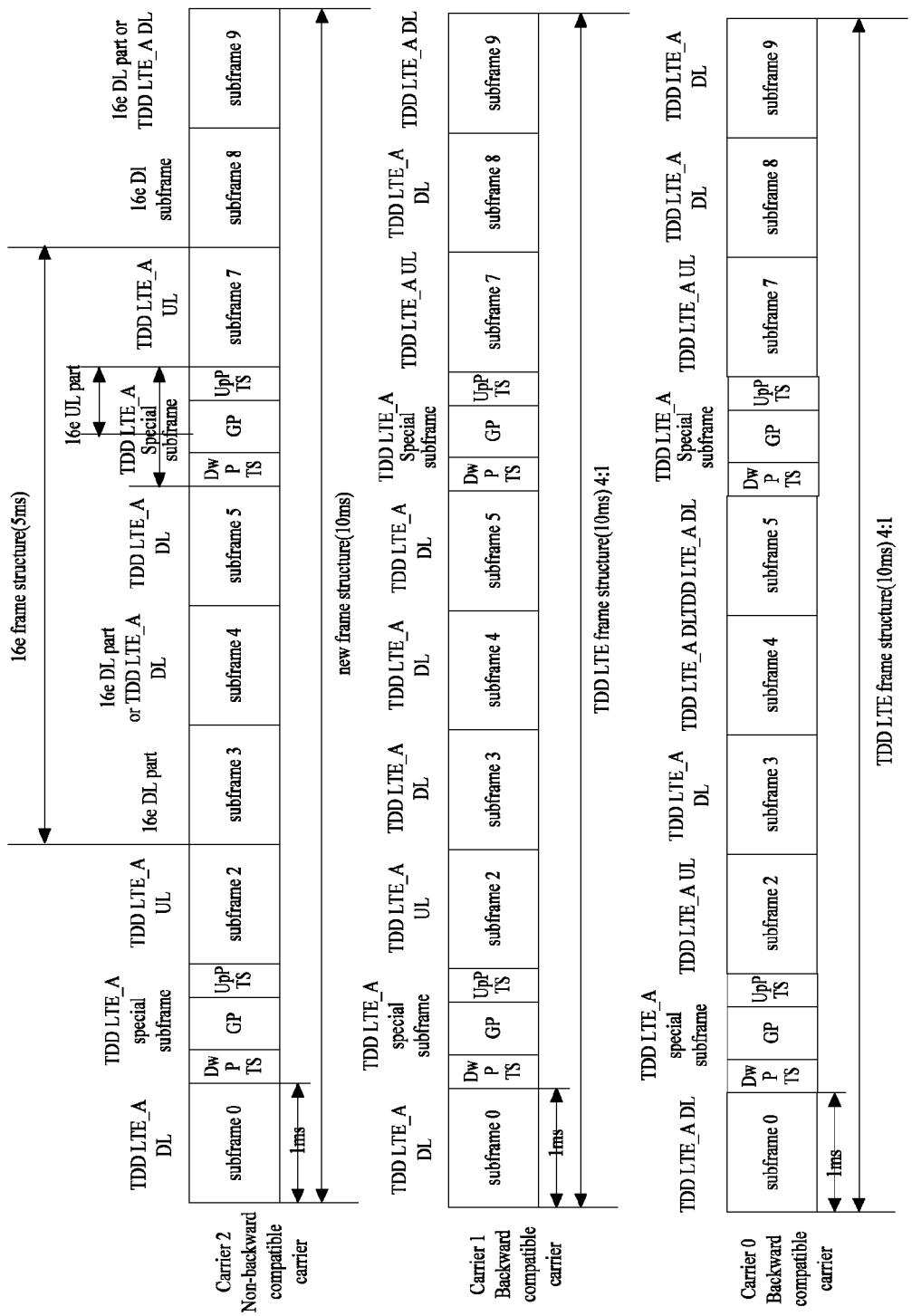
FIG. 6 shows a structure of subframes with a subframe configuration ratio of 4:1 in a TDD LTE-A system backward compatible with a TDD LTE system and a 16e system.

FIG. 5 shows a structure of subframes with a subframe configuration ratio of 3:2 in a TDD LTE-A system backward compatible with a TDD LTE system and an 16e system. FIG. 6 shows a structure of subframes with a subframe configuration ratio of 4:1 in a TDD LTE-A system backward compatible with a TDD LTE system and an 16e system. The non-backward compatible carrier of the TDD LTE-A system is used to carry a new frame structure of the TDD LTE-A system compatible with the 16e terminal, where the new frame structure may be completely backward compatible with the 16e terminal. The remaining time-frequency resources that are actually used by non-16e-terminal of the non-backward compatible carrier of the TDD LTE-A system may be allocated to a terminal of the TDD LTE-A system.

As shown in Table 4, Table 4 shows the configuration ratio of the new frame structure carried on the non-backward compatible carrier of the TDD LTE-A system that is backward compatible with the TDD LTE system and the 16e system.

TABLE 4

| New Uplink/ Downlink Configuration | Uplink/ Downlink Switching Period | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 1 | 5 ms | D | S* | 16e U | U | 16e D | D | S* | 16e U | U | 16e D |
| 2 | 5 ms | D | S(16e U) | U | 16e D | 16e D | D | S(16e U) | U | 16e D | 16e D |
| 3 | 5 ms | D | S(16e U) | U | 16e D | D | D | S(16e U) | U | 16e D | D |
| 4 | 5 ms | D | S(16e U) | U | D | 16e D | D | S(16e U) | U | D | 16e D |

In Table 4, D indicates a downlink subframe of the TDD LTE-A system, U indicates an uplink subframe of the TDD LTE-A system, and S* indicates that the UpPTS may also be the uplink part of the 16e system. Because the UpPTS is not configured with a random access channel and does not schedule any user to send a sounding reference symbol (SRS), the UpPTS is freed by the TDD LTE-A system. S (16e U) indicates that the uplink part of the 16e system occupies the UpPTS and part of the GP; 16e U indicates the uplink part of the 16e system; 16e D indicates the downlink part of the 16e system. In Table 4, the difference between configuration 3 and configuration 4 lies in the downlink resource position of the 16e system.

As shown in Table 5, Table 5 shows the relationship among the uplink/downlink configurations, configuration of the special subframe, and uplink/downlink configuration ratio of the 16e system in the frame structure of the TDD LTE-A compatible with the 16e system.

TABLE 5

| Uplink/Downlink Configuration | Configuration of the Special Subframe | Downlink Part of the 16e System: Uplink Symbol/16e Symbol | Downlink Part Actually Used by the 16e System: Uplink Part (16e Symbol) | Downlink Part Actually Used by the TDD LTE-A System: Uplink Part (TDD LTE_A Symbol) |
|---|---|---|---|---|
| 1 | 12:1:1 (configuration 4 in Table 3) | 28:19 | 9:9 | 26:14 |
|   | 10:3:1 (configuration 2 in Table 3) | 27:20 | 9:10 | 24:14 |
|   | 9:3:2 (configuration 6 in Table 3) | 26:21 | 9:11 | 23:14 |
| 2 | 9:3:2 (configuration 6 in Table 3) | 35:12 | 9:2 | 37:14 |
|   | 3:9:2 (configuration 5 in Table 3) | 34:13 | 9:3 | 31:14 |
|   | 3:9:2 (configuration 5 in Table 3) | 33:14 | 9:4 | 31:14 |
|   | 3:9:2 (configuration 5 in Table 3) | 32:15 | 9:5 | 31:14 |
|   | 3:9:2 (configuration 5 in Table 3) | 31:16 | 9:6 | 31:14 |
| 3 | 9:3:2 (configuration 6 in Table 3) | 35:12 | 19:2 | 23:14 |
|   | 3:9:2 (configuration 5 in Table 3) | 34:13 | 19:3 | 17:14 |
|   | 3:9:2 (configuration 5 in Table 3) | 33:14 | 19:4 | 17:14 |
|   | 3:9:2 (configuration 5 in Table 3) | 32:15 | 19:5 | 17:14 |
|   | 3:9:2 (configuration 5 in Table 3) | 31:16 | 19:6 | 17:14 |
| 4 | 9:3:2 (configuration 6 in Table 3) | 35:12 | 9:2 | 37:14 |
|   | 3:9:2 (configuration 5 in Table 3) | 34:13 | 9:3 | 31:14 |
|   | 3:9:2 (configuration 5 in Table 3) | 33:14 | 9:4 | 31:14 |
|   | 3:9:2 (configuration 5 in Table 3) | 32:15 | 9:5 | 31:14 |
|   | 3:9:2 (configuration 5 in Table 3) | 31:16 | 9:6 | 31:14 |

In the embodiment, in a CA scenario of the second system, the information of the downlink resource carrier is sent according to the downlink resource configured by the 16e system and the TDD LTE-A system in the new frame structure of the TDD LTE-A system, where the information of the downlink resource carrier includes the information of the downlink resource carrier compatible with the 16e system; the information of the uplink resource carrier is received according to the uplink resource configured by the 16e system and the TDD LTE-A system in the new frame structure of the TDD LTE-A system, where the information of the uplink resource carrier includes the information of the uplink resource carrier compatible with the 16e system. In this way, the second system uses the part of time-frequency resources on non-compatible carriers, and the remaining part of time-frequency resources are allocated to the terminal of the first system. In this manner, in one aspect, the integration and coexistence of the two systems can be implemented, and inter-system interference is reduced; and in another aspect, the resource utilization can be maximized.

Figure 7:
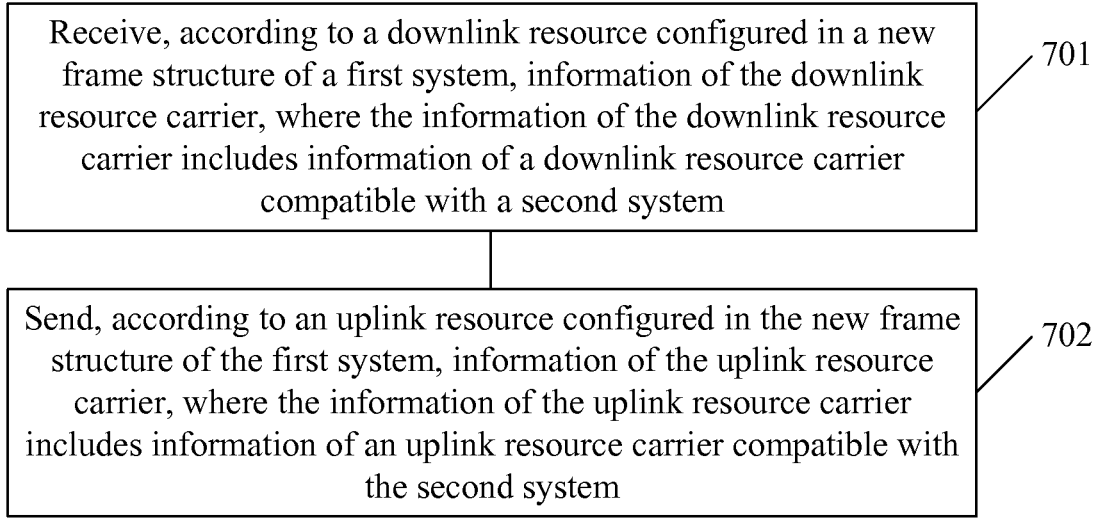
FIG. 7 is a flowchart of a system compatibility method in a third embodiment of the present invention.

Referring to FIG. 7, a method for reducing interference of carrier compatibility in a third embodiment according to an embodiment of the present invention includes the following steps.

Step 701: Receive, according to a downlink resource configured in a new frame structure of a first system, information of the downlink resource carrier, where the information of the downlink resource carrier includes information of a downlink resource carrier compatible with the second system.

Step 702: Send, according to an uplink resource configured in the new frame structure of the first system, information of the uplink resource carrier, where the information of the uplink resource carrier includes information of an uplink resource carrier compatible with the second system.

The new frame structure is integrated by a frame structure of the first system and a frame structure of the second system. Under the frame structure, the two systems can be guaranteed to work normally.

In embodiments of the present invention, in a CA scenario of the second system, the information of the downlink resource carrier is sent according to the downlink resource configured in the new frame structure of the first system, where the information of the downlink resource carrier includes the information of the downlink resource carrier compatible with the second system; the information of the uplink resource carrier is received according to the uplink resource configured in the new frame structure of the first system, where the information of the uplink resource carrier includes the information of the uplink resource carrier compatible with the second system. In this way, the second system uses a part of time-frequency resources on non-compatible carriers, and the remaining part of time-frequency resources are allocated to a terminal of the first system. In this manner, in one aspect, the integration and coexistence of the two systems can be implemented, and inter-system interference is reduced; and in another aspect, the resource utilization can be maximized.

Figure 8:
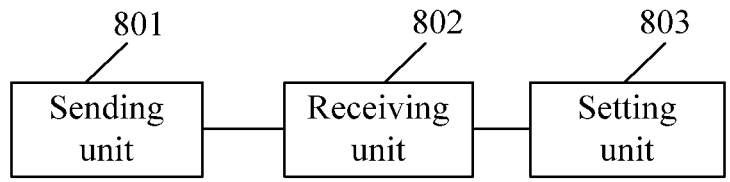
FIG. 8 is a structural schematic diagram of a system compatibility apparatus in an embodiment of the present invention.

FIG. 8 is a structural schematic diagram of an apparatus for reducing interference of carrier compatibility in an embodiment of the present invention. The apparatus includes a sending unit 801 that is configured to send, according to a downlink resource configured in a new frame structure of a first system, information of the downlink resource carrier. The information of the downlink resource carrier includes information of a downlink resource carrier compatible with a second system. A receiving unit 802 is configured to receive, according to an uplink resource configured in the new frame structure of the first system, information of the uplink resource carrier. The information of the uplink resource carrier includes information of an uplink resource carrier compatible with the second system.

The new frame structure is integrated by a frame structure of the first system and a frame structure of the second system. Under the frame structure, the two systems can be guaranteed to work normally. The apparatus further includes a setting unit 803 that is configured to set a start position of at least one carrier that carries the new frame structure to be the same as a start position of at least one carrier that carries a special sub-frame in the first system.

In the embodiment, in a CA scenario of the second system, the information of the downlink resource carrier is sent according to the downlink resource configured in the new frame structure of the first system, where the information of the downlink resource carrier includes the information of the downlink resource carrier compatible with the second system; the information of the uplink resource carrier is received according to the uplink resource configured in the new frame structure of the first system, where the information of the uplink resource carrier includes the information of the uplink resource carrier compatible with the second system. In this way, the second system uses a part of time-frequency resources on non-compatible carriers, and the remaining part of time-frequency resources are allocated to a terminal of the first system. In this manner, in one aspect, the integration and coexistence of the two systems can be implemented, and inter-system interference is reduced; and in another aspect, the resource utilization can be maximized.

Figure 9:
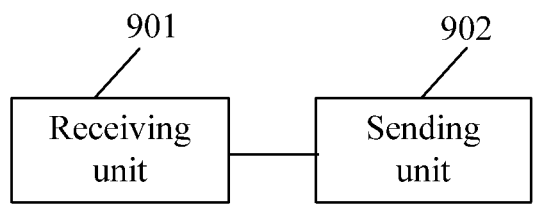
FIG. 9 is a structural schematic diagram of a UE in an embodiment of the present invention.

Referring to FIG. 9, FIG. 9 is a structural schematic diagram of a UE provided in an embodiment of the present invention, and the UE includes a receiving unit 901 and a sending unit 902.

The receiving unit 901 is configured to receive, according to a downlink resource configured in a new frame structure of a first system, information of the downlink resource carrier. The information of the downlink resource carrier includes information of a downlink resource carrier compatible with a second system.

The sending unit 902 is configured to send, according to an uplink resource configured in the new frame structure of the first system, information of the uplink resource carrier. The information of the uplink resource carrier includes information of an uplink resource carrier compatible with the second system.

The new frame structure is integrated by a frame structure of the first system and a frame structure of the second system. Under the frame structure, the two systems can be guaranteed to work normally.

In the embodiment, in a CA scenario of the second system, the information of the downlink resource carrier is sent according to the downlink resource configured in the new frame structure of the first system, where the information of the downlink resource carrier includes the information of the downlink resource carrier compatible with the second system; the information of the uplink resource carrier is received according to the uplink resource configured in the new frame structure of the first system, where the information of the uplink resource carrier includes the information of the uplink resource carrier compatible with the second system. In this way, the second system uses a part of time-frequency resources on non-compatible carriers, and the remaining part of time-frequency resources are allocated to a terminal of the first system. In this manner, in one aspect, the integration and coexistence of the two systems can be implemented, and inter-system interference is reduced; and in another aspect, the resource utilization can be maximized.

It is understandable to those skilled in the art that all or part of the steps in the preceding embodiments may be implemented by computer program instructing relevant hardware. The program may be stored in a computer readable storage medium. When the program runs, the processes of the preceding method embodiments are executed. The storage medium may be a magnetic disk, a compact disk-read only memory (CD-ROM), a read only memory (ROM) or a random access memory (RAM). The preceding description of the embodiments enables those skilled in the art to implement or use the present invention. It is apparent that those skilled in the art can make various modifications to the technical solutions described in the embodiments. The general principle defined in the specification can be implemented in other embodiments without departing from the spirit or the scope of the present invention. Therefore, the present invention is not limited to the exemplary embodiments in the specification, but shall cover the broadest scope according to the principles and novelties disclosed in the specification.

What is claimed is:

1. A method for facilitating system compatibility, the method comprising:
   sending, by a base station according to a downlink resource configured in a new frame structure of a first system, information of a downlink resource carrier, wherein the information of the downlink resource carrier comprises information of a downlink resource carrier compatible with a second system; and
   receiving, by the base station according to an uplink resource configured in the new frame structure of the first system, information of an uplink resource, wherein the information of the uplink resource carrier comprises information of an uplink resource carrier compatible with the second system, wherein an uplink pilot time slot in the new frame structure of the first system is occupied by both a subframe of the first system and an uplink part of the second system, wherein before sending the information of the downlink resource carrier, the method further comprises sending, over at least one carrier of the first system, a broadcast message or a unicast message, wherein the broadcast message or the unicast message carries uplink/downlink configuration information of the new frame structure and configuration information of resources used by the first system and the second system, and wherein the configuration information of the resources used by the first system and the second system comprises configuration of a special subframe in the new frame structure, a ratio of the number of symbols of the downlink resource used by the second system to the number of symbols of the uplink resource used by the second system, and a ratio of the number of subframes of the downlink resource used by the first system to the number of subframes of the uplink resource used by the first system.

2. The method according to claim 1, wherein:
the first system comprises multiple carrier resources, wherein at least one carrier carries the new frame structure;
at least one carrier of the first system carries a frame structure of a special subframe; and
a start position of the carrier that carries the new frame structure is the same as a start position of the carrier that carries the frame structure of the special subframe.

3. The method according to claim 2, wherein carrying the new frame structure comprises:
carrying, by at least one non-backward compatible carrier, the new frame structure.

4. The method according to claim 1, wherein the new frame structure comprises:
an uplink resource and a downlink resource used by the second system, and an uplink resource used by the first system.

5. The method according to claim 4, wherein:
the uplink resource used by the second system is located at an uplink start part of the new frame structure; and
the downlink resource used by the second system is located at a subframe other than a first subframe and a second subframe of the new frame structure.

6. The method according to claim 4, wherein:
the downlink resource allocated in the new frame structure of the first system comprises at least one subframe, and the subframe has a length of 1 ms.

7. The method according to claim 4, wherein:
the uplink resource allocated in the new frame structure of the first system comprises at least one subframe, and the subframe has a length of 1 ms.

8. The method according to claim 1, wherein the new frame structure comprises:
an uplink resource and a downlink resource used by the second system, and a downlink resource used by the first system.

9. The method according to claim 1, wherein the new frame structure comprises:
an uplink resource and a downlink resource used by the second system, and an uplink resource and a downlink resource used by the first system.

10. The method according to claim 1, wherein:
a first symbol of the downlink resource used by the second system in the new frame structure is a preamble, and the second symbol starts to carry a downlink map.

11. The method according to claim 1, wherein:
at least two symbols of the uplink resource are used by the second system in the new frame structure is at least two.

12. The method according to claim 1, wherein the configuration information of the resources used by the first system and the second system further comprises a ratio of the number of symbols of the downlink resource used by the first system to the number of symbols of the uplink resource used by the first system.

13. The method according to claim 1, wherein the first system is a time division duplex (TDD) long term evolution-advanced (LTE-A) system and the second system is an IEEE 802.16e system.

14. The method according to claim 1, wherein the subframe of the first system and the uplink part of the second system occupy common resources of the uplink pilot time slot in the new frame structure of the first system.

15. A system compatibility apparatus, comprising:
a sending unit, configured to send, according to a downlink resource configured in a new frame structure of a first system, information of a downlink resource carrier, wherein the information of the downlink resource carrier comprises information of a downlink resource carrier compatible with a second system; and
a receiving unit, configured to receive, according to an uplink resource configured in the new frame structure of the first system, information of an uplink resource carrier, wherein the information of the uplink resource carrier comprises information of an uplink resource carrier compatible with the second system, wherein an uplink pilot time slot of the new frame structure of the first system is occupied by both a subframe of the first system and an uplink part of the second system, wherein before sending the information of the downlink resource carrier, the sending unit is further configured to send, over at least one carrier of the first system, a broadcast message or a unicast message, wherein the broadcast message or the unicast message carries uplink/downlink configuration information of the new frame structure and configuration information of resources used by the first system and the second system, and wherein the configuration information of the resources used by the first system and the second system comprises configuration of a special subframe in the new frame structure, a ratio of the number of symbols of the downlink resource used by the second system to the number of symbols of the uplink resource used by the second system, and a ratio of the number of subframes of the downlink resource used by the first system to the number of subframes of the uplink resource used by the first system.

16. The apparatus according to claim 15, further comprising:
a setting unit, configured to set a start position of at least one carrier that carries the new frame structure to be the same as a start position of at least one carrier that carries the frame structure of a special subframe.

17. A user equipment (UE), comprising:
a receiving unit, configured to receive, according to a downlink resource configured in a new frame structure of a first system, information of a downlink resource carrier, wherein the information of the downlink resource carrier comprises information of a downlink resource carrier compatible with a second system; and
a sending unit, configured to send, according to an uplink resource configured in the new frame structure of the first system, information of an uplink resource carrier, wherein the information of the uplink resource carrier comprises information of an uplink resource carrier compatible with the second system, wherein an uplink pilot time slot of the new frame structure of the first system is occupied by both a subframe of the first system and an uplink part of the second system, wherein before receiving the information of the downlink resource carrier, the receiving unit is further configured to receive, over at least one carrier of the first system, a broadcast message or a unicast message, wherein the broadcast message or the unicast message carries uplink/downlink configuration information of the new frame structure and configuration information of resources used by the first system and the second system, and wherein the configuration information of the resources used by the first system and the second system comprises configuration of a special subframe in the new frame structure, a ratio of the number of symbols of the downlink resource used by the second system to the number of symbols of the uplink resource used by the second system, and a ratio of the number of subframes of the downlink resource used by the first system to the number of subframes of the uplink resource used by the first system.

18. The UE according to claim 17, wherein the subframe of the first system and the uplink part of the second system occupy common resources of the uplink pilot time slot in the new frame structure of the first system.

19. The apparatus according to claim 15, wherein the subframe of the first system and the uplink part of the second system occupy common resources of the uplink pilot time slot in the new frame structure of the first system.

* * * * *